United States Patent
Sterne et al.

(10) Patent No.: US 7,184,440 B1
(45) Date of Patent: Feb. 27, 2007

(54) MULTI-PROTOCOL SWITCH AND METHOD THEREFORE

(75) Inventors: Jason T. Sterne, Ottawa (CA); Thomas E. Davis, Ottawa (CA); Robert E. Robotham, Ottawa (CA); Shay Nahum, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 390 days.

(21) Appl. No.: 09/625,586

(22) Filed: Jul. 26, 2000

(51) Int. Cl.
*H04L 12/56* (2006.01)
*H04I 12/50* (2006.01)

(52) U.S. Cl. ............... 370/395.52; 370/353; 370/392; 370/399; 370/395.21

(58) Field of Classification Search ........ 370/351–353, 370/357, 389, 390, 392, 394, 395.1–399, 370/395.21–395.32, 395.5, 395.52, 464–466, 370/469

See application file for complete search history.

(56) References Cited

U.S. PATENT DOCUMENTS

| | | | | |
|---|---|---|---|---|
| 5,568,477 A * | 10/1996 | Galand et al. | ............... | 370/229 |
| 5,822,319 A * | 10/1998 | Nagami et al. | ............. | 370/392 |
| 5,917,819 A * | 6/1999 | Yang et al. | .................. | 370/390 |
| 5,963,555 A * | 10/1999 | Takase et al. | ......... | 370/395.52 |
| 6,097,726 A * | 8/2000 | Puntambekar et al. | ...... | 370/397 |
| 6,128,649 A * | 10/2000 | Smith et al. | ................ | 709/217 |
| 6,147,999 A * | 11/2000 | Honda et al. | ............... | 370/396 |
| 6,259,699 B1 * | 7/2001 | Opalka et al. | ............... | 370/398 |
| 6,317,433 B1 * | 11/2001 | Galand et al. | ........... | 370/395.2 |
| 6,356,546 B1 * | 3/2002 | Beshai | ........................ | 370/358 |
| 6,377,574 B1 * | 4/2002 | Endo | .......................... | 370/359 |
| 6,535,513 B1 * | 3/2003 | Kao et al. | ................. | 370/395.1 |
| 6,611,522 B1 * | 8/2003 | Zheng et al. | .......... | 370/395.21 |
| 6,680,933 B1 * | 1/2004 | Cheesman et al. | .......... | 370/352 |
| 6,781,994 B1 * | 8/2004 | Nogami et al. | .......... | 370/395.1 |
| 6,944,153 B1 * | 9/2005 | Buckland et al. | ........... | 370/376 |

(Continued)

FOREIGN PATENT DOCUMENTS

EP      0 719 065 A1      6/1996

(Continued)

OTHER PUBLICATIONS

Guarene et al, IP and ATM Integration Perspectives, IEEE Communication Magazine, Jan. 1998, pp. 74-80.*

(Continued)

*Primary Examiner*—Wellington Chin
*Assistant Examiner*—Ahmed Elallam (57) ABSTRACT

A multi-protocol switch that supports both ATM and IP traffic and method for use is presented. The multi-protocol switch associates certain input connections, as identified by virtual path identifier/virtual connection identifier (VPI/VCI), with either IP or ATM traffic. When the connection identifier for a cell received indicates that the cell is an ATM cell, the multi-protocol switch forwards the cell through the switch, where the forwarding is based on the connection identifier for the cell. If the connection identifier for a cell indicates that the cell is IP traffic, the cell is stored with other cells included in the IP packet to which the cells correspond within the ingress line card of the switch. The destination address included in the packet is used to determine a forwarding decision for the cells included in the packet. After at least partial reassembly, the packet is segmented and forwarded through the switch based on the forwarding decision determined from the destination address.

33 Claims, 6 Drawing Sheets

U.S. PATENT DOCUMENTS 6,980,553 B2 * 12/2005 Miki et al. ............... 370/395.1
7,095,760 B1 * 8/2006 Parruck et al. ............. 370/539

FOREIGN PATENT DOCUMENTS

EP 0 917 390 A2 5/1999

OTHER PUBLICATIONS

Arutaki et al, ATM and IP Integration by Built-in IP Handling Capacity in an ATM Switching System, ATM Workshop, 1999, IEEE Proceedings, pp. 141-146.*

Stepahne Martignoni, et al.; Extension of Classical IP Over ATM to Support Qos at the Application Level (article); 1998, pp. 492-499; IEEE.

Victor R. Parente; Packet Over Sonet; Ringing Up Speed, POS Shunts LAN Traffic onto the WAN a Whole Lot Faster than ATM (serial); Mar. 1998; pp. 86-92; Data Communications, Mar. 1998: XP-000740961.

Tai Won Um, et al.; A Study on Interworking Scenarios Between ATM-Based MPLS Network and IPOA/LANE Network (article); pp. 1-6; XP-001075712.

* cited by examiner

MULTI-PROTOCOL SWITCH AND METHOD THEREFORE

FIELD OF THE INVENTION

The invention relates generally to communication networks, and more particularly to a multi-protocol switch used in communication networks and a method therefore.

BACKGROUND OF THE INVENTION

Communication networks typically include a plurality of switches that are intercoupled to allow data to be communicated among the switches and hosts that are coupled to the communication network. Each host may be an individual user such as a personal computer, telephone, facsimile machine, etc. In other cases, a host may be other network components such as a server, private branch exchange (PBX), etc.

A variety of protocols have been developed to allow for data communication in such communication networks. One data communication protocol is asynchronous transfer mode (ATM), which transmits data between hosts using fixed-length cells. Virtual connections may be established between switches and/or hosts such that cells corresponding to a particular communication may be routed over such virtual connections in an efficient manner. Each virtual connection may be identified by an individual virtual connection identifier (VCI) that is included in each cell such that each switch knows how to forward the particular cell so that it reaches its proper destination.

ATM switches are typically capable of supporting a number of classes of service, where each class of service (COS) has a set of parameters that relate to how the data is transmitted. For example, one class of service may provide a certain bandwidth guarantee, a certain cell loss ratio, and a certain maximum delay for transmission. A different class of service may also have values for these parameters, where the values may indicate that the first class of service is superior to the second class of service. The various classes of service commonly available in ATM are well known in the art, and various parameters within each class of service may be configured within a particular system based on the physical limitations present in the network as well as the needs of the users.

Another data communication protocol is Internet Protocol (IP). IP data transmission utilizes packets of data, where the packets may not be of a fixed length. In a communication network that supports IP, the switches are commonly referred to as routers, as they route the IP traffic based on the destination address for the packet. The next hop, or the next router to which the packet is to be forwarded, is often determined using a longest prefix match on the destination IP address. Thus, forwarding of an IP packet within a router is performed in a different manner than determining an egress connection for an ATM cell in an ATM switch.

In some cases, it is desirable to allow a particular communication network to carry data traffic corresponding to a number of different protocols. For example, it may be desirable to have a communication network that supports both ATM and IP traffic. In order to simplify the network, it may be desirable to include switching blocks (which may be switches or routers) that support the forwarding of both ATM and IP traffic.

Therefore, a need exists for a multi-protocol switching block that supports a number of different data communication protocols in an efficient manner.

DETAILED DESCRIPTION OF A PREFERRED EMBODIMENT OF THE INVENTION

Generally, the present invention provides a multi-protocol switch that supports both ATM and IP traffic. The multi-protocol switch associates certain input connections, as identified by virtual path identifier/virtual connection identifier (VPI/VCI), with either IP or ATM traffic. When the VPI/VCI identifier for a cell received indicates that the cell is an ATM cell, the multi-protocol switch forwards the cell through the switch based on the connection identifier for the cell. If the connection identifier for a cell indicates that the cell is IP traffic, the cell is stored with other cells included in the IP packet to which the cells correspond within the ingress line card of the switch. The destination address included in the packet is used to determine a forwarding decision for the cells included in the packet. After at least partial reassembly, the packet is segmented and forwarded through the switch based on the forwarding decision determined.

Forwarding of cells corresponding to an IP packet through the switch may include forwarding them over transport interfaces, where there may be numerous transport interfaces between particular ingress and egress line cards. Each of these transport interfaces may have a different set of transport parameters that define a class of service for each of the transport interfaces. As such, different classes of service are provided for IP traffic in a similar manner as to the different classes of service supported for different virtual connections (VCs) that carry ATM traffic within a switch or network. By supporting IP traffic within the switch using a number of configurable transport interfaces, and supporting ATM traffic within the switch using a number of configurable VCs, the allocation of resources within the switch for each of these types of traffic is configurable as desired. Furthermore, resource allocation between the different protocols is also possible.

By configuring an ATM switch to support IP traffic through the creation of service interfaces, which recognize that certain VPI/VCI connections correspond to IP traffic, and transport interfaces, which can provide different classes of service for IP traffic, a multi-protocol switch that provides a number of advantages is achieved. Additional types of service interfaces may also be included in the switch, where such service interfaces are designed to accept IP traffic over packet-over-SONET (POS) interfaces, GigE interfaces, or interfaces that support other Layer 2 protocols. Such a multi-protocol switch may provide additional advantages in the area of multicasting. Because ATM switch architectures are better suited to supporting multicasting, IP traffic within the multi-protocol switch that is based on an ATM switch can also enjoy some of these multicasting advantages.

Figure 1:
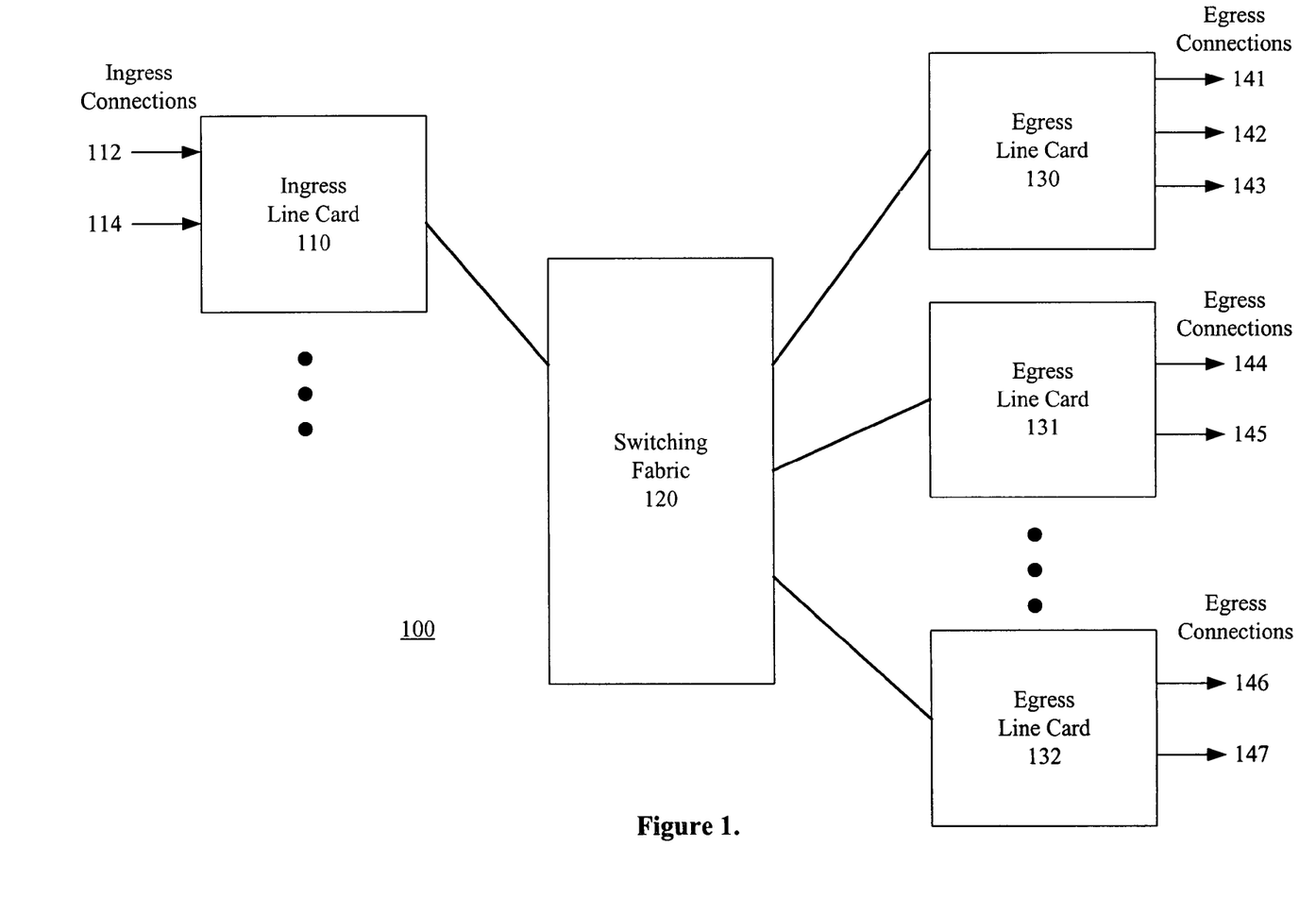
FIG. 1 includes an illustration of a block diagram of a multi-protocol switch in accordance with a particular embodiment of the present invention.

The invention can be better understood with reference to FIGS. 1–6. FIG. 1 illustrates a block diagram of a multi-protocol switch 100. The multi-protocol switch 100 includes a plurality of line cards. Each of the line cards can serve as an ingress line card and an egress line card with respect to the flow of data traffic for the switch. However, in order to simplify the discussion, FIG. 1 is shown to include an ingress line card 110 and a plurality of egress line cards 130–132. Note that the number of line cards included in a particular switch can vary from switch to switch. The line cards within the switch 100 are intercoupled by a switching fabric 120.

Data is received by the ingress line card 110 over the ingress connections 112 and 114, which may represent only a portion of the ingress connections that provide data to the ingress line card 110. The data received is routed through the switching fabric 120 to one or more of the egress line cards 130–132. Each egress line card forwards the data it receives over one or more of the egress connections supported by that particular line card. For example, the egress line card 130 supports egress connections 141–143, the egress line card 131 supports egress connections 144–145, and the egress line card 132 supports egress connections 146–147.

ATM data may be received over one or more of the ingress connections 112–114. Different ATM ingress virtual connections (VCs) are identified by their connection identifier, which may be a unique VPI/VCI combination. Thus, when the ingress line card 110 receives an ATM cell, the ingress line card 110 can determine the forwarding decision internal to the switch 100 based on the VPI/VCI combination. The ATM data is then routed through the switching fabric 120 to one or more of the egress line cards 130–132. The egress line card then forwards the ATM cell over one or more of the egress connections 141–147. Essentially, the multi-protocol switch 100 establishes a semi-permanent joining between a particular ingress VC (identified by a VPI/VCI) and an egress VC. A lookup table may be used to store the relationship between an ingress VC and an egress VC such that forwarding of ATM cells is simplified.

Each of the paths within the switch over which ATM traffic is forwarded can be characterized by a different set of parameters corresponding to the class of service received over that path, where each path may be a VC internal to the switch. These parameters can include bandwidth allocation, guaranteed latency, maximum cell loss ratio, etc. As such, the switch provides a great deal of configurability with respect to ATM traffic such that various classes of service can be made available to different types of users.

In order to allow similar configurability for IP traffic that is to be forwarded within the switch, the route over which the IP traffic flows may be divided into separate segments. These segments can include service interfaces, which represent the points at which the IP traffic enters and exits the switch, and transport interfaces, which represent the paths through the switch over which the IP traffic is carried.

Figure 2:
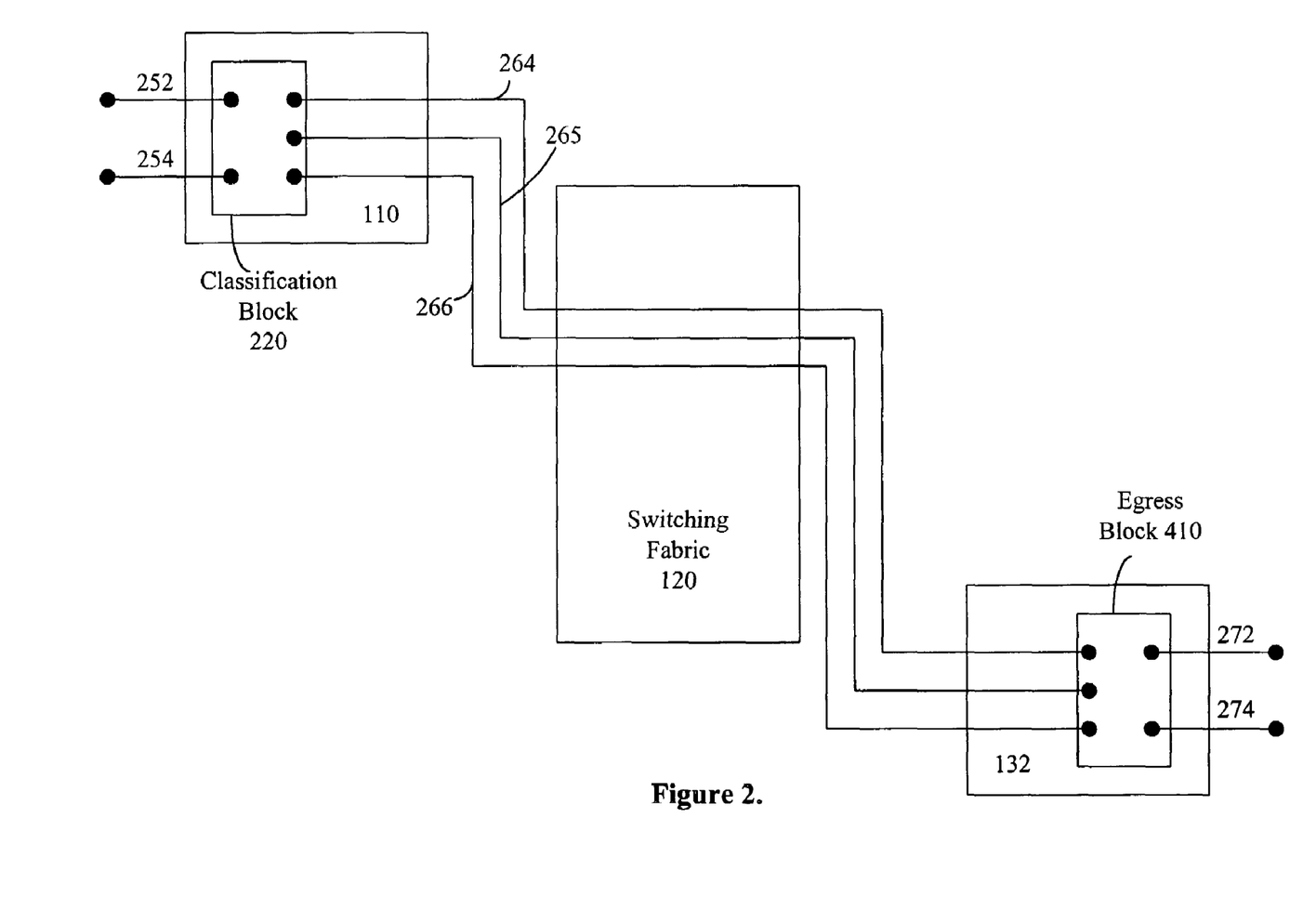
FIG. 2 includes an illustration of a block diagram of the multi-protocol switch of FIG. 1, where emphasis is placed on the data paths associated with IP traffic.

FIG. 2 provides a block diagram of a portion of the switch 100 with emphasis on the IP traffic support portions of the switch. The ingress line card 110 includes a classification block 220, where the classification block 220 receives IP traffic over service interfaces 252 and 254. Service interfaces 252 and 254 correspond to ingress connections that have specific connection identifiers, which may be VPI/VCI combinations, that the classification block 220 recognizes as connection identifiers corresponding to IP traffic. Thus, the classification block 220 includes a list of the VPI/VCI combinations that represent ingress connections over which IP traffic is carried. Based on this knowledge, the classification block 220 can reassemble the packets associated with this IP traffic and subsequently forward these packets over one or more of the transport interfaces 264–266 that exists between the ingress line card 110 and the egress line card 132. Note that in FIG. 2, only those transport interfaces 264–266 between the ingress line card 110 and the egress line card 132 are illustrated. Additional transport interfaces may exist between the ingress line card 110 and the other egress line cards included in the multi-protocol switch 100.

Each of the transport interfaces 264–266 may be characterized by a set of transport parameters similar to those used to characterize internal VCs that carry ATM traffic within the multi-protocol switch 100. Thus, each of the transport interfaces 264–266 may provide a different class of service, as defined by parameters such as bandwidth allocation, latency, etc.

Because the transport interfaces 264–266 provide a number of different forwarding options between the ingress line card 110 and the egress line card 132, the classification block 220 can determine the particular class of service to be used for forwarding each packet received over the service interfaces 252 and 254. Based on this classification, the classification block 220 forwards the packet over a corresponding transport interface such that data within the packet receives the appropriate service level within the switch. Such configurability of internal routing for IP traffic within the multi-protocol switch 100 provides numerous advantages over prior art switches and routers. Furthermore, because the multi-protocol switch 100 may be adapted from an ATM switch architecture, there are already a number of built in controls associated with bandwidth allocation, queuing, etc that allow for the different classes of service for the IP traffic to be easily supported.

Within the egress line card 132, an egress block 410 receives the IP traffic over the transport interfaces 264–266. Based on the destination address included in each of the packets, the egress block 410 forwards the IP traffic over one or more of the service interfaces 272 and 274. Note that when the classification block 220 reassembles the packet prior to forwarding, the classification block 220 may resolve some of the forwarding issues with respect to determining the appropriate egress service interface over which the data should be forwarded by the egress line card 132. This information may be included in the packet as it is forwarded through the switch 100 such that the egress block 410 does not have to repeat this forwarding decision determination. As such, the packet may include an egress index that is used to reference an egress index table, where such a table provides the identity of the appropriate egress service interface(s) over which to forward the data. This will be described in additional detail with respect to FIG. 5 below.

Figure 3:
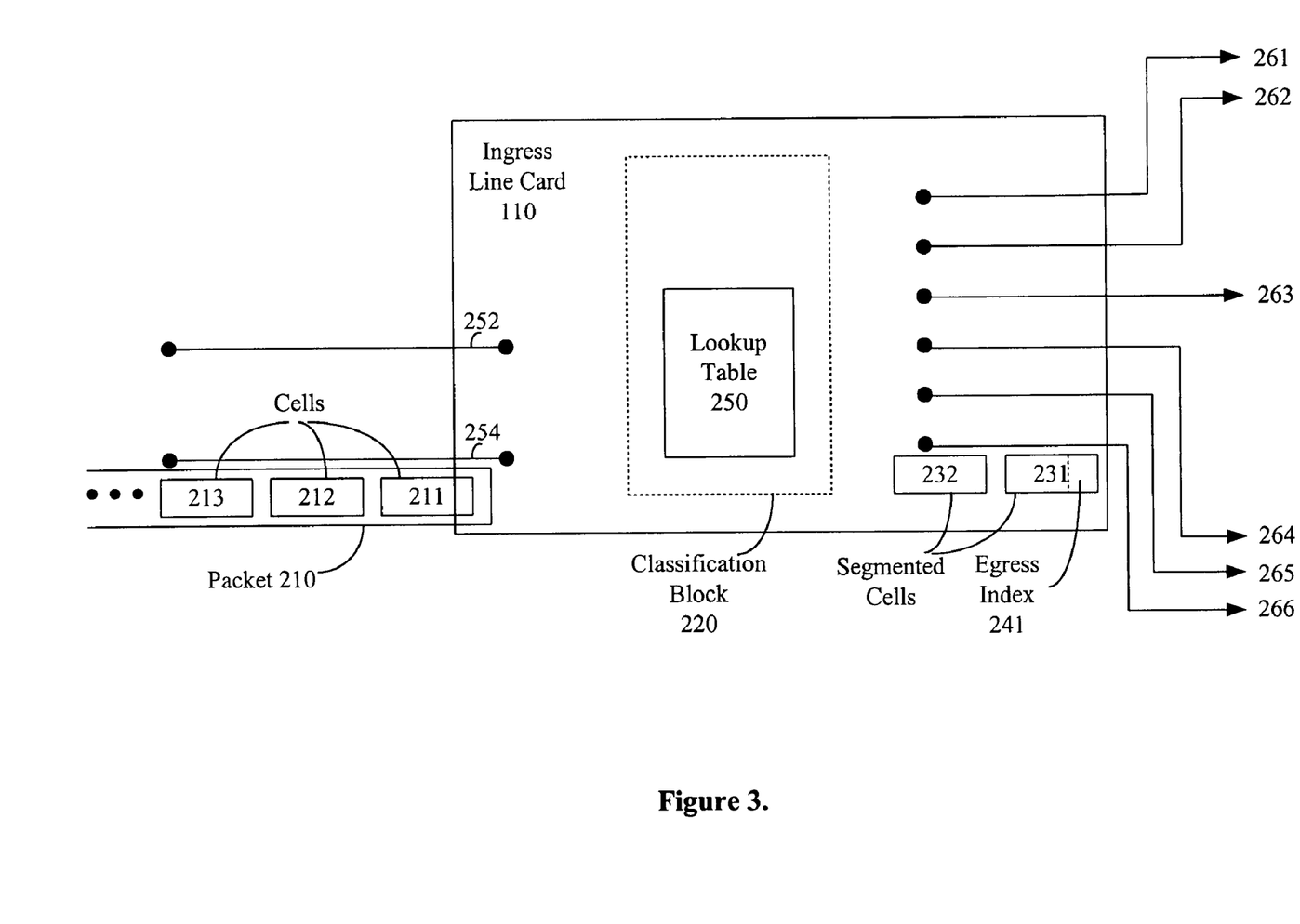
FIG. 3 includes an illustration of a block diagram of an ingress line card included in the switch of FIG. 1 with emphasis on routing of the IP traffic within the ingress line card.

FIG. 3 illustrates the ingress line card 110 in additional detail. In the illustration of FIG. 3, additional transport interfaces 261–263 have been illustrated, where these transport interfaces cross the switching fabric 120 and couple to egress line cards other than the egress line card 132. The ingress line card 110 receives IP traffic over the service interfaces 252 and 254. An IP packet 210 is shown being received over the service interface 254.

The packet 210 is divided into a plurality of cells 211–213 (note that a small number of cells have been used to simplify the example). Thus, even though IP traffic is packet based, the data is divided into a number of cells for transmission through portions of the network, including the multi-protocol switch 100. When the cell 211, which is the first cell of the packet 210, is received, the cell 211 includes a connection identifier corresponding to the ingress connection over which the cell 211 is received. A lookup table 250 is consulted to determine if the cell 211 represents ATM traffic or IP traffic. The lookup table 250 stores protocol information corresponding to the plurality of ingress connections associated with the ingress line card 110. Thus, the ingress connection identifier, which may be the VPI/VCI for the cell, may be used to reference the protocol information and the lookup table 250.

If the cell received is ATM traffic, the cell is forwarded by itself without having to wait for any other cells to be received. For such cells, the internal VC for the cell is determined based on the ingress connection identifier, and the cell is forwarded along the internal VC to the appropriate egress line card. Once it reaches the egress line card, the cell is then forwarded on via one or more egress connections.

When it is determined that the cell 211 represents IP traffic, the packet 210, or at least a portion thereof, is reassembled prior to forwarding the cells for the packet through the switch 100. As the packet is reassembled within the ingress line card 110, the destination address included in the header of the packet can be examined to determine where the packet is to be sent within the switch. Furthermore, this destination address may also indicate the appropriate egress connection (or service interface or port) over which to forward the packet once it has reached the egress line card of the switch. The destination address can be used to select a particular transport interface over which to forward the packet. As described above, there may be a number of transport interfaces between the ingress line card 110 and a particular egress line card. Each set of transport interfaces between a particular ingress line card and a particular egress line card may be referred to as a transport interface group (TIG). Selection of an appropriate transport interface within a transport interface group may be performed based on the appropriate class of service for the packet. This will be described in additional detail with respect to FIG. 4 below.

In order to facilitate IP traffic support, the ingress line card may include a number of queuing structures or memory that allows for packets to be reassembled prior to segmentation and forwarding. Thus, as the packet 210 is received, the cells 211–213 included in the packet 210 are stored within the memory or queue corresponding to that packet such that the packet is reassembled. Reassembly may utilize linked-list structures that link data corresponding to different cells received for the packet. Once reassembly is complete, resegmentation of the packet 210 may occur to generate a number of segmented cells 231 and 232 (only a small number of segmented cells are used in the example for clarity) that are forwarded across the transport interface selected. Total reassembly of the packet may not be required in some embodiments, and a particularly advantageous technique for such packet forwarding is described in a co-pending patent application Ser. No. 09/426,791 entitled "METHOD AND APPARATUS FOR SEGMENTATION AND REASSEMBLY OF DATA PACKETS IN A COMMUNICATION SWITCH", which was filed on Oct. 22, 1999 and which is assigned to the same assignee as the present application.

As the segmented cells 231 and 232 are generated for forwarding, additional information may be stored in one or more of the segmented cells such that the forwarding operations in the egress line card are simplified. This control information may be used by the egress line card to select one or more egress connections over which the packet is forwarded following reassembly in the egress line card. Such control information may include the egress index 241 shown to be included in the segmented cell 231. The egress index 241 may be used to reference an egress index table that is described in additional detail with respect to FIG. 5 below.

In some embodiments, multicasting of IP packets may be supported by the multi-protocol switch 100. Multicasting enables a single packet or cell to be sent to multiple end destinations via multiple paths. As such, a packet that is received may be routed to a number of egress line cards over a multicast tree. The use of a multicast tree allows the packet to be forwarded to the switching fabric a single time, whereupon the switching fabric performs the replication and distribution of the packet to the branches of the multicast tree. Such multicasting is commonly performed for ATM cells within ATM switches. In ATM multicasting, a lookup of the VPI/VCI is used to determine a multicast connection identifier (MCI) that determines the destinations within the switch to which the cells are forwarded. The MCI represents a layer 2 tree through the switch. Each multicast tree is represented by a unique MCI. As such, the support structure required for IP multicasting may be derived from ATM multicasting techniques already existing. This may be accomplished by assigning MCI based trees to support IP multicasting. When actual multicasting occurs, the MCI is used within the switching fabric to send the cells to all of the desired destinations within the switch, where the replication of the cells for distribution is preferably performed by the switching fabric to improve system efficiency.

As stated above, multicast cells to be sent to a plurality of egress line cards, or a plurality of egress connections on a single line card are identified by an MCI included in the multicast cells. Note that these cells may be ATM cells, or cells included in an IP packet. For multicast cells, a bitmap included in the header of the cell may indicate to which of the egress line cards the particular cell is to be forwarded. Thus, there may be a separate bit in the bitmap corresponding to each egress line card. Each egress line card can then translate the common multicast connection identifier into a different output decision in terms of selecting an appropriate egress connection supported by that individual egress line card. Within the egress line card, the MCI is applied to a lookup table that provides all of the information that is required to determine the appropriate egress connections over which to forward the multicast cells.

In another multicast embodiment, the switching fabric may perform a lookup operation based on the multicast connection identifier to determine the set of egress line cards to which the cell for packet is to be forwarded. Once again, the egress line card utilized the multicast connection identifier in order to determine the appropriate egress connections over which to forward the cell or packet.

For IP multicasting, a portion of the destination IP address may be used to indicate that a packet is a multicast packet. In such cases, the source and destination IP addresses for the packet may be used in combination to perform a lookup operation using a multicast trie or other destination lookup block. The lookup operation is used to determine the appropriate egress line cards (and possibly appropriate egress connections on those line cards) to which the particular packet is to be forwarded. This information may be encoded as a multicast connection identifier and bitmap similar to those used for ATM multicasting.

By inserting a multicast connection identifier (MCI) into each cell taken from a multicast IP packet before it is forwarded through the switch 100, the switch 100 can be configured to accommodate that MCI in terms of multicast forwarding to multiple egress line cards. Thus, the underlying support for ATM multicasting can be utilized to forward individual IP cells in a similar manner as to that used for ATM multicast operations.

In some embodiments, the capabilities of the multi-protocol switch 100 may include the capability to support packet-over-SONET (POS) protocol data traffic. In order to support POS traffic, a POS input port, which may be dedicated to servicing POS traffic is included on the ingress line card 110. Similarly, one or more of the egress line cards may include a POS egress port. As was the case with IP packets, the ingress line card segments POS packets received over the POS input port to produce cells, which may be referred to as POS segmented cells. These POS segmented cells are forwarded over one or more of the plurality of transport interfaces 261–266 coupled to the ingress line card 110.

Because the POS input ports are dedicated to POS traffic, there is no need to determine whether the data being received over those ports is packet-based through the use of a lookup table as is done for IP traffic. Because the POS data is received in packet format rather than cell format, no reassembly of the cells into a packet is required in the ingress line card prior to segmentation and forwarding through the switch.

In some embodiments, data traffic may arrive at the switch in POS format and exit the switch in ATM format. Similarly, data traffic may arrive in ATM format and exit the switch in POS format. Such restructuring of the data traffic is independent of the manner in which it moves through the switch. All traffic moves through the switching fabric 120 in cell format (preferably ATM-based cell format), and in the case where it is to exit the switch 100 in packet format, the reassembly operations corresponding to the packet are performed within the egress line card.

In yet other embodiments, the multi-protocol switch 100 may support multi-protocol label switching (MPLS) traffic. MPLS packets are treated similar to IP packets with a difference being in that the determination of the forwarding decision for MPLS packets is based on a label rather than a destination address. Thus, data cells are received and determined to correspond to packet based data rather than cell-based data, the MPLS label is detected within the packet. Once detected, the MPLS label is used by the ingress line card 110 to determine the forwarding decision for the MPLS packet. Some examples of labels that can be used to determine the forwarding decisions include both "generic labels" and VPI/VCI labels, both of which are used in MPLS over ATM. Generic labels are at the front of the packet itself (where the label is imbedded in the ATM data portion of the cell), whereas VPI/VCI labels are encoded directly into the VPI/VCI in the header of the ATM cell.

Such use of labels to determine forwarding decisions may include the use of an MPLS table that is separate from the table that stores the forwarding decisions for IP packets. Both of these tables may be included in the lookup table block 250 shown in FIG. 3.

In order to support MPLS traffic within the switch, label switched paths (LSPs), which resemble ATM virtual connections in terms of their ability to be configured based on a number of parameters, may exist within the switch 100. As was the case with IP traffic, the connection oriented nature of the ATM switch topology can be used to support MPLS in a manner that provides numerous advantages. In one embodiment, the switch may perform per-LSP queuing in a manner similar to that used to perform per-VC queuing in a conventional ATM switch.

Figure 4:
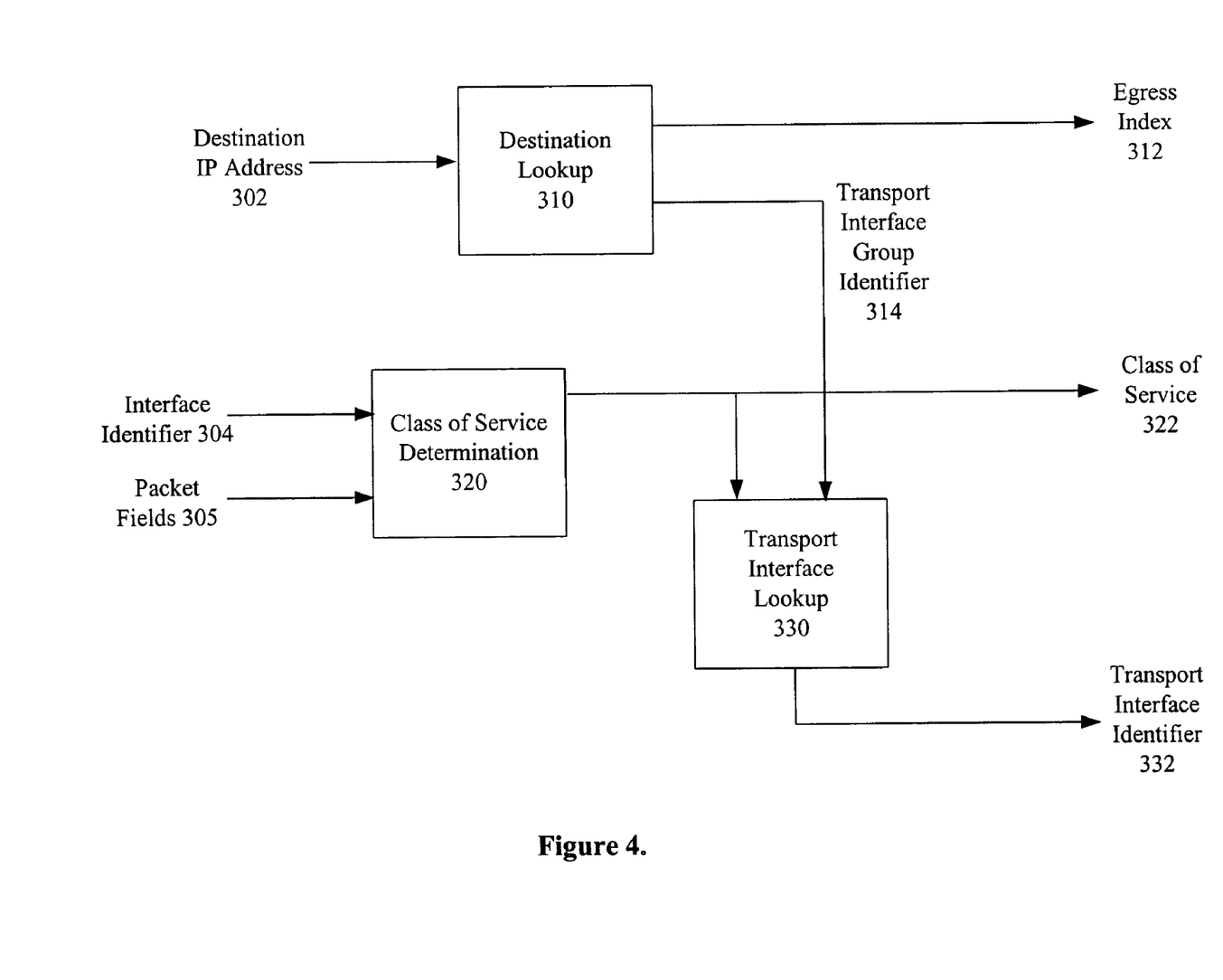
FIG. 4 includes an illustration of a block diagram of a classification block associated with forwarding IP traffic within the ingress line card illustrated in FIG. 3.

FIG. 4 illustrates a block diagram of various functions that may be performed by the classification block 220 of FIGS. 2 and 3. For an IP packet received, the classification block 220 may utilize the destination IP address 302 to determine a transport interface group identifier 314 and an egress index 312. This can be accomplished by applying the destination IP address 302 to a destination lookup block 310. The result of the lookup can provide the desired egress index 312 and transport interface group identifier 314. As stated above, the egress index 312 may be used by the egress line card to determine over which egress connection the IP packet is forwarded.

The transport interface group identifier 314 selects a particular transport interface group, where each transport interface group includes at least one transport interface, that is to be used for forwarding the IP packet. Thus, the transport interface group identifier 314 can be used with a class of service 322 to determine the appropriate transport interface over which the packet will be sent. The class of service 322 may be derived from an interface identifier 304 (such as a VPI/VCI) and a number of additional packet fields 305 that may be included in the packet (such as in the IP and TCP headers), The class of service 322 may indicate the desired transport parameters for the transport interface that is to carry the cells that make up the packet to the egress line card. As such, the transport interface lookup block 330 can be used to generate the appropriate transport interface identifier 332 based on the particular transport interface group and the class of service desired within that group.

Figure 5:
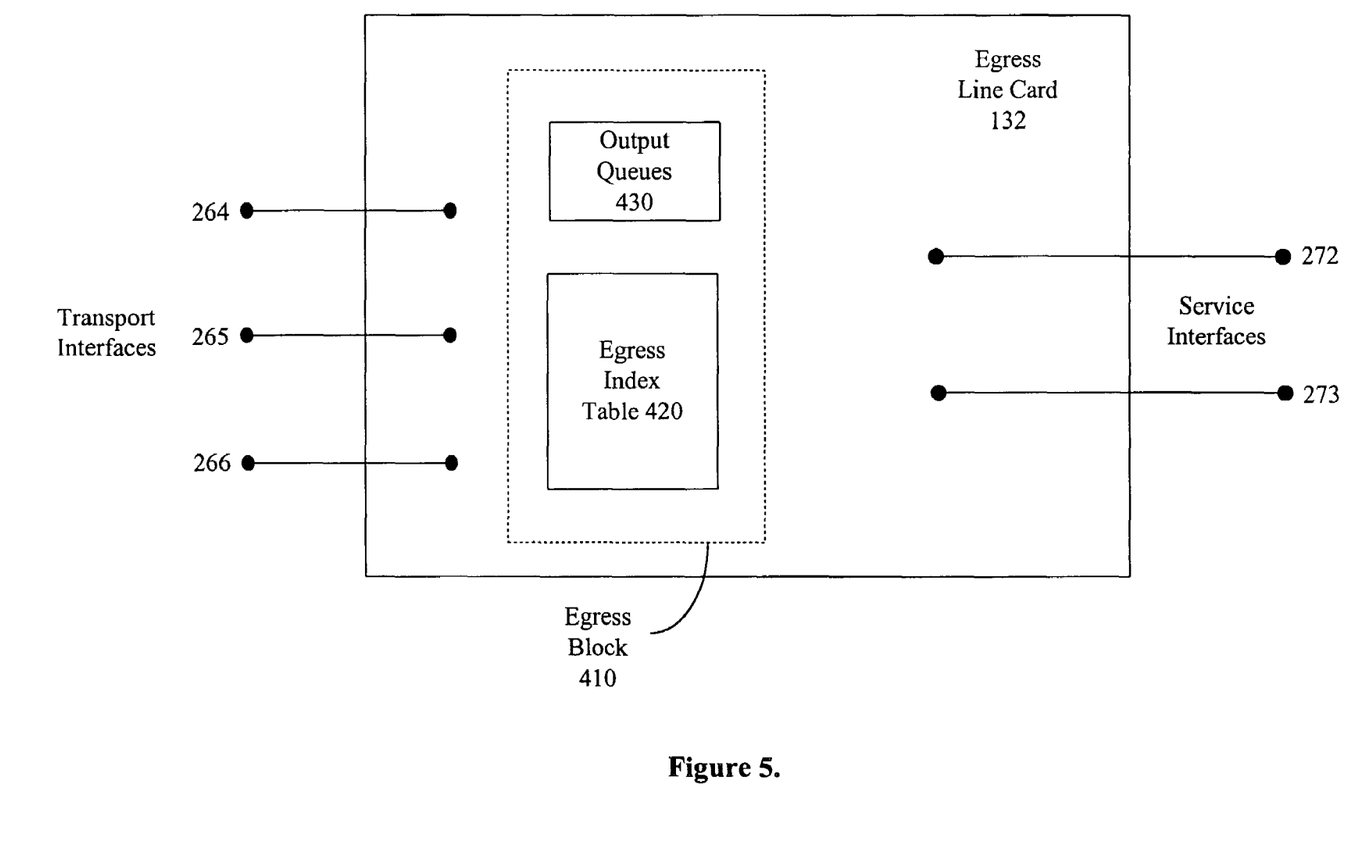
FIG. 5 includes an illustration of a block diagram of an egress line card included in the switch of FIGS. 1 and 2.

FIG. 5 illustrates a block diagram of an egress line card 132 that is shown to support transport interfaces 264–266 and service interfaces 272 and 273. The transport interfaces represent the paths over which packet-based data is received from ingress line cards in the switch via the switching fabric. Upon receipt of cells corresponding to a packet over one of the transport interfaces 264–266, the egress block 410 reassembles the packet within which these cells are included. Once reassembled, the egress block 410 queues the packet in one of a plurality of output queues 430 associated with the transmission of data out over the service interfaces 272 and 273.

Reassembling the packets and determining the appropriate output queue in which the reassembled packet should be queued may be facilitated by the inclusion of an egress index in the first cell of the packet as it is relayed across the switch 100. This egress index is applied to the egress index table 420 to determine the output queue into which the packet should be queued, the output connection identifier that determines which of the service interfaces 272 and 273 is used to forward the packet, and possibly other information such as how the packet should be encapsulated prior to transmission. Note that the class of service associated with the packet may also be relayed as part of the cell stream for the packet as transmitted over the transport interface. As such, this class of service can be used in conjunction with the set of output queues 430 to provide selective output queuing of the data such that different levels of transmission priority are supported. Such selective output queuing is commonly used in ATM switches and can be used to provide similar functionality for IP traffic.

It should be noted that the egress line card 132 as illustrated in FIG. 5 has been described to emphasize the support of IP traffic within the egress line card 132. The ATM traffic support within the egress line card 132 includes the use of the output queues 430 to provide ATM cells to the appropriate egress virtual connections associated with the egress line card 132 based on the connection identifier included in each of the cells. As such, various transmission priority levels can also be achieved for the ATM traffic based on the output queuing performed.

Figure 6:
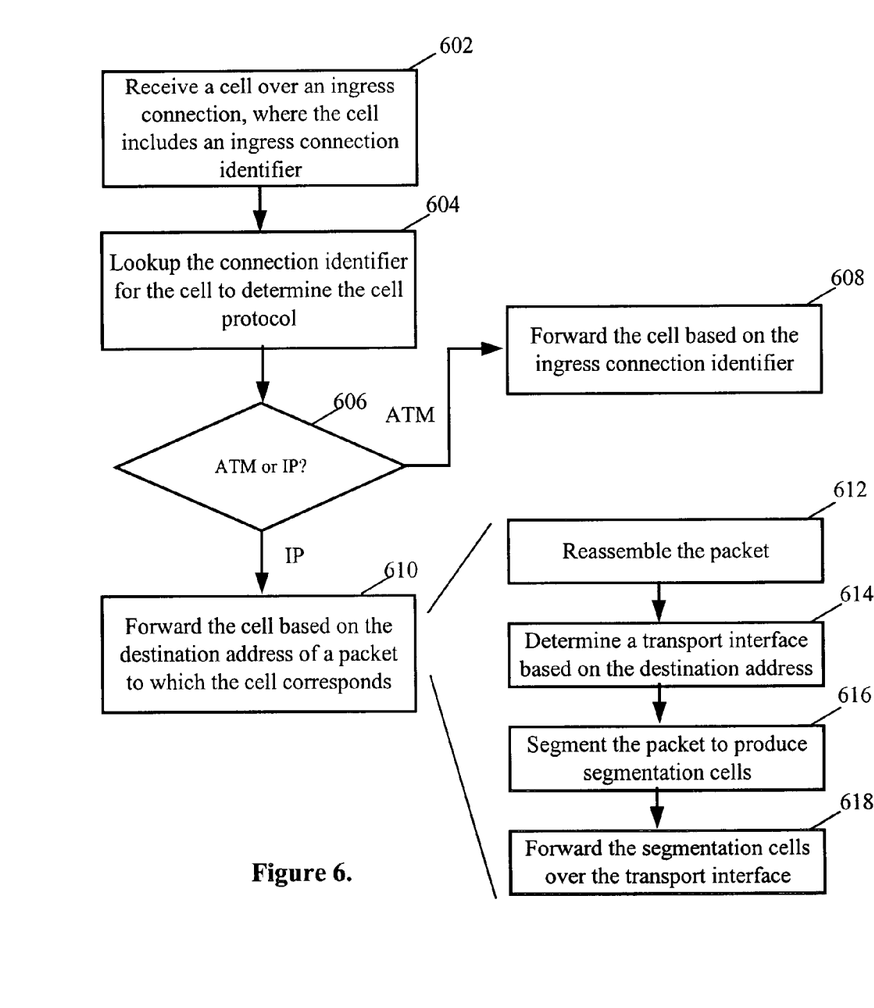
FIG. 6 includes an illustration of a flow diagram of a method for supporting multi-protocol traffic within a multi-protocol communication switch in accordance with a particular embodiment of the present invention.

FIG. 6 illustrates a flow diagram of a method for routing cell traffic using a multi-protocol switch. At step 602, a cell is received over an ingress connection, where the cell includes an ingress connection identifier. The ingress connection identifier may be a VPI/VCI format identifier, where certain VPI/VCI combinations are recognized to correspond to IP traffic.

In some embodiments, the cells to be forwarded within the switch are derived from packets received by an ingress line card. The ingress line card may include a POS port or a port adapted for other packet-based protocols. For example, IP traffic may be received as a plurality of cells that have been derived from a packet or in packet format where such division into cells has not yet occurred. When IP traffic is received as a plurality of cells, the cells have been generated by taking an IP packet and segmenting it into smaller portions that are inserted into cells. Such segmentation may occur at other points within the network, and as a result, IP traffic may enter the multi-protocol switch in the pre-segmented format. In such an instance, the cells are normally used to recreate the packet which is then segmented again for forwarding within the switch. Similarly, MPLS packets may be received in packet form or as a plurality of cells that have been derived from the segmentation of a packet. When the cells to be forwarded within the switch are received as packets, segmentation of the packets into cells is performed within the ingress line card.

At step 604, the cell protocol for the cell is determined based on the ingress connection identifier. This may be accomplished by using the ingress connection identifier to reference a lookup table, where the lookup table stores the protocol information for the various connections supported by the ingress line card. Although many protocols may be supported by the multi-protocol switch, the flow diagram of FIG. 6 concentrates on a method corresponding to a multi-protocol switch that specifically supports ATM and IP traffic. In other embodiments, switches may include support for Frame Relay (FR), Gigabit Ethernet (GigE), or POS.

At step 606, it is determined whether the protocol for the cell is ATM or IP. If the protocol is ATM, the method proceeds to step 608, and the cell is forwarded through the switch based on the connection identifier. Thus, the ingress VPI/VCI is used to determine the appropriate internal VC over which to forward the ATM cell. Within the egress line card, the connection identifier is used to determine the appropriate egress VC over which to forward the ATM cell.

Note that the forwarding performed at step 608 may include selecting (based on the VPI/VCI for the cell) a selected virtual connection of a plurality of virtual connections that exist across the switching fabric of the multi-protocol switch between the ingress line card receiving the cell and the egress line card which is to forward the cell over an egress connection. Such selection allows a variety of classes of service to be supported for the ATM data traffic within the switch. The selection is generally a mapping of cells having a particular VPI/VCI to a selected virtual connection that already exists within the switch. The virtual connections that exist within a switch are pre-configured to support a particular class of service, and the mapping does not allow different classes of service for ATM cells having the same VPI/VCI. Once the appropriate virtual connection has been selected, the cell is forwarded using a selected virtual connection such that it is provided with the class of service desired. Each of these virtual connections may be characterized by a set of service parameters, where the service parameters can include such characteristics as bandwidth allocated, maximum cell delay, maximum cell loss ratio, etc.

It is determined at step 606 that the cell received corresponds to IP traffic, the method proceeds to step 610. At step 610, the cell is forwarded based on a destination address for the packet to which the cell corresponds. Thus, rather than forwarding the cell based on the connection identifier, the destination address for the packet to which the cell belongs is examined to determine the forwarding decision.

Steps 612–618 illustrate a number of steps that may be included in the forwarding of cells corresponding to an IP packet. At step 612, the packet is reassembled, where such reassembly includes storing the received cell with additional cells included in the packet. Such reassembly produces a reassembled packet.

At step 614, the destination address for the packet, which may be determined from specific cells that make up the packet or from the reassembled packet, is used along with a desired class of service for the packet to determine a transport interface to be used for forwarding the packet within the switch. As described earlier, the class of service can be used to differentiate between a number of different potential transport interfaces included in a transport interface group that provides paths between the ingress line card that has received the packet and the desired egress line card to which the packet is to be forwarded. Providing such a plurality of transport interfaces between ingress line cards and egress line cards allows for more flexible configuration of how IP data traffic is carried within the switch.

At step 616, the reassembled packet is segmented to produce segmentation cells. At step 618, these segmentation cells are forwarded using the transport interface determined at step 614. Once received by the egress line card, the segmentation cells are reassembled to recover the packet, and the packet is then forwarded over one or more of the egress connections supported by the egress line card. The determination as to which of the egress connections should be used for forwarding the packet can be simplified by using the destination address to make such a determination in the ingress line card, and including an egress index in the segmentation cells forwarded across the switching fabric. As such, the egress line card can use the egress index to perform its forwarding operations by applying the egress index to an egress index table to determine the appropriate egress connections. As described earlier, forwarding segmentation cells may include forwarding the segmentation cells over a plurality of transport interfaces to a plurality of egress line cards, such that multicasting of IP traffic is supported.

By basing the multi-protocol switch on ATM switch designs, the multi-protocol switch can provide a number of advantages over prior art routers that have been modified to support ATM traffic. This is due to the fact that ATM is set up to provide various classes of service and multicasting advantages that can be also be valuable in the transmission of IP traffic. By providing a number of transport interfaces that have different classes of service between ingress and egress line cards, similar traffic flow control for IP data can be achieved as is commonly possible for ATM data in ATM switches. Similarly, the multicasting techniques used for multicasting ATM cells can be leveraged to allow the multi-protocol switch to provide multicasting capabilities for IP traffic in an efficient manner.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multi-protocol switch, comprising:
   a plurality of egress line cards, wherein each of the plurality of egress line cards supports at least one egress connection;
   a switching fabric operably coupled to the plurality of egress line cards; and
   an ingress line card operably coupled to the switching fabric, wherein the ingress line card receives cells over a plurality of ingress connections, wherein each cell includes an ingress connection identifier, wherein the ingress line card determines a cell protocol for each cell based on the ingress connection identifier corresponding to the cell, wherein when the cell protocol is a first protocol, the ingress line card determines a forwarding decision based on an input connection identifier for the cell, wherein when the cell protocol is a second protocol, the ingress line card determines the forwarding decision based on a destination address for a packet to which the cell corresponds, wherein the ingress line card forwards at least a portion of the cell over the switching fabric to at least one of the plurality of egress line cards based on the forwarding decision.

2. The multi-protocol switch of claim 1, wherein the ingress line card includes a lookup table, wherein the lookup table stores protocol information for each ingress connection of the plurality of ingress connections, wherein the ingress line card references the lookup table to determine the cell protocol for each cell received.

3. The multi-protocol switch of claim 1, wherein when the cell protocol is the second protocol, the ingress switch at least partially assembles the packet to which the cell corresponds to produce a reassembled packet, wherein the ingress line card segments the reassembled packet to produce segmented cells, wherein forwarding cells included in the packet over the switching fabric is accomplished by forwarding the segmented cells over the switching fabric based on the forwarding decision determined based on the destination address for the packet.

4. The multi-protocol switch of claim 3, wherein when an egress line card of the plurality of egress line cards receives segmented cells, the egress line card reassembles the segmented cells to produce an egress packet, wherein the egress line card forwards the egress packet over at least one selected egress connection based on the destination address for the packet from which the segmented cells were derived.

5. The multi-protocol switch of claim 4, wherein forwarding the segmented cells over the switching fabric further comprises forwarding control information with the segmented cells, wherein the control information is used in the determination of the at least one selected egress connection.

6. The multi-protocol switch of claim 1 further comprises a plurality of transport interfaces between the ingress line card and the plurality of egress line cards, wherein each transport interface of the plurality of transport interfaces provides a route from the ingress line card across the switching fabric to a destination egress line card of the plurality of egress line cards, wherein determining a forwarding decision based on the destination address includes determining a selected transport interface of the plurality of transport interfaces.

7. The multi-protocol switch of claim 1 further comprises a transport interface group (TIG) between the ingress line card and a first egress line card of the plurality of egress line cards, wherein the TIG includes a plurality of transport interfaces, wherein each transport interface of the plurality of transport interfaces is is characterized by a plurality of transport parameters, wherein determining a forwarding decision based on the destination address includes selecting a transport interface of the plurality of transport interfaces based on a class of service associated with the cell.

8. The multi-protocol switch of claim 7, wherein cells of the first protocol are forwarded over the switching fabric to at least one of the plurality of egress line cards using virtual connections within the multi-protocol switch, wherein each of the virtual connections is characterized by a plurality of connection parameters, wherein the plurality of connection parameters for a selected virtual connection characterize a class of service provided across the virtual connection.

9. The multi-protocol switch of claim 8, wherein the ingress line card includes a packet-over-SONET (POS) input port that supports POS, wherein when an input packet is received over the POS input port, the ingress line card segments the input packet to produce POS segmented cells, wherein the POS segmented cells are forwarded over at least one of the plurality of transport interfaces.

10. The multi-protocol switch of claim 8, wherein the first protocol is asynchronous transfer mode (ATM) and the second protocol is internet protocol (IP).

11. The multi-protocol switch of claim 10, wherein the cell protocol for each cell is one of ATM, IP, and multi-protocol label switching (MPLS), wherein when the cell protocol is MPLS, the ingress line card determines the forwarding decision based on a label included for an MPLS packet to which the cell corresponds.

12. The multi-protocol switch of claim 8, wherein transport interfaces between the input line card and a particular egress line card of the plurality of egress line cards are grouped into a transport interface group, wherein the transport interfaces within each transport interface group provide different classes of service.

13. The multi-protocol switch of claim 1, wherein the ingress line card forwards at least a portion of the cells received corresponding to the second protocol to a multicast set of egress line cards of the plurality of line cards, wherein cells forwarded to a multicast set of egress line cards are multicast cells corresponding to a multicast packet.

14. The multi-protocol switch of claim 13, wherein the multicast cells are identified by the ingress line card based on a multicast connection identifier.

15. The multi-protocol switch of claim 14, wherein each multicast cell includes a bit map that indicates which egress line cards of the plurality of egress line cards are included in the multicast set of egress line cards.

16. The multi-protocol switch of claim 14, wherein the egress line cards included in the multicast set of egress line cards is determined by the switching fabric based on the multicast connection identifier.

17. A method for routing cell traffic using a multi-protocol switch, comprising:
   receiving a cell over an ingress connection, wherein the cell includes an ingress connection identifier;
   determining a cell protocol for the cell based on the ingress connection identifier;
   when the cell protocol for the cell is a first protocol, routing the cell through the multi-protocol switch based on the ingress connection identifier; and
   when the cell protocol for the cell is a second protocol, routing the cell through the multi-protocol switch based on a destination address for a packet to which the cell corresponds, wherein determining the cell protocol further comprises referencing a lookup table using the ingress connection identifier to determine the cell protocol for the cell, wherein the lookup table stores a protocol indication for a plurality of ingress connection identifiers, wherein the ingress connection identifier for the cell is included in the plurality of ingress connection identifiers.

18. The method of claim 17, wherein the first protocol is asynchronous transfer mode (ATM) and the second protocol is internet protocol (IP).

19. The method of claim 17, wherein routing the cell through the multi-protocol switch based on the destination address further comprises:
   storing the cell with additional cells included in the packet to which the cell corresponds to produce a reassembled packet;
   determining the destination address for the packet from at least one cell included in the packet;
   segmenting the reassembled packet to produce segmentation cells; and
   forwarding the segmentation cells through the multi-protocol switch based on the destination address.

20. The method of claim 19 further comprises:
   determining an egress index for the reassembled packet based on the destination address; and
   using the egress index to forward at least a portion of the reassembled packet to at least one egress connection.

21. The method of claim 17, wherein forwarding the cell through the multi-protocol switch further comprises forwarding the cell across a switching fabric to at least one selected egress line card of a plurality of egress line cards.

22. The method of claim 21, wherein when the cell protocol is the first protocol, forwarding the cell across the switching fabric further comprises:
   selecting a virtual connection of a plurality of virtual connections across the switching fabric to the selected egress line card; and
   forwarding the cell using the virtual connection.

23. The method of claim 22, wherein each of the plurality of virtual connections is characterized by a set of service parameters.

24. The method of claim 21, wherein when the cell protocol is the second protocol, forwarding the cell across the switching fabric further comprises:
   selecting a selected transport interface of a plurality of transport interfaces across the switching fabric to the selected egress line card; and
   forwarding the cell using the selected transport interface.

25. The method of claim 24, wherein each transport interface of the plurality of transport interfaces is characterized by a set of service parameters.

26. The method of claim 21, wherein forwarding the cell across a switching fabric further comprises multicasting the cell to a plurality of egress connections included on at least one of the plurality of egress line cards.

27. A multi-protocol switch that supports at least asynchronous transfer mode (ATM) and internet protocol data (IP), comprising:
   a plurality of egress line cards, wherein each of the plurality of egress line cards supports at least one egress connection;
   a switching fabric operably coupled to the plurality of egress line cards; and
   an ingress line card operably coupled to the switching fabric, wherein the ingress line card receives cells over a plurality of ingress connections, wherein each cell includes an ingress connection identifier, wherein the ingress line card determines whether each cell corresponds to ATM or IP based on the ingress connection identifier for the cell,
      wherein when the cell corresponds to ATM, the ingress line card forwards the cell across the switching fabric to at least one egress line card of the egress line cards based on the ingress connection identifier for the cell,
      wherein when the cell corresponds to IP, the ingress line card:
         at least partially reassembles a packet to which the cell corresponds to produce a reassembled packet;
         determines a destination address to which the packet corresponds;
         segments the reassembled packet to produce segmented cells; and
         forwards the segmented cells across the switching fabric to at least one egress line card of the plurality of egress line cards based on the destination address.

28. The multi-protocol switch of claim 27, the ingress line card forwards the segmented cells across the switching fabric using a selected transport interface that is selected based on the destination address and a class of service for the packet.

29. The multi-protocol switch of claim 28, wherein at least one of the segmented cells of the packet includes an egress index, wherein the egress index is used by the at least one egress line card to determine an egress connection over which to forward the packet after reassembly of the segmented cells in the at least one egress line card.

30. A multi-protocol switch that supports cell based data and packet based data, comprising:
   an egress line card that includes a first service interface, wherein the first service interface supports at least one egress connection;
   a switching fabric operably coupled to the egress line card; and
   an ingress line card operably coupled to the switching fabric, wherein the ingress line card includes a second service interface, wherein a transport interface group provides a plurality of transport interfaces that couple the second service interface and the first service interface via the switching fabric, wherein each transport interface of the plurality of transport interfaces is characterized by a set of transport parameters, wherein the ingress line card receives cells corresponding to cell based data over a first ingress connection and forwards the cells across the switching fabric to the egress line card based on an ingress connection identifier included in each cell, wherein the ingress line card receives packets over a second ingress connection, wherein the ingress line card segments each packet received to produce segmented cells and forwards the segmented cells to the egress line card over a selected transport interface of the plurality of transport interfaces, wherein the selected transport interface is determined based on a class of service associated with the packet.

31. The multi-protocol switch of claim 30, wherein the ingress line card selects the selected transport interface by selecting the transport interface group based on a destination address included in the packet and by selecting the selected transport interface from the plurality of transport interfaces using the class of service associated with the packet.

32. The multi-protocol switch of claim 31, wherein the second service interface supports receipt of packet data over SONET (POS) interfaces.

33. Apparatus comprising:

a multi-protocol switch, wherein the multi-protocol switch comprises a plurality of egress line cards, wherein each of the plurality of egress line cards supports at least one egress connection, a switching fabric operably coupled to the plurality of egress line cards, and an ingress line card operably coupled to the switching fabric, wherein the ingress line card determines a cell protocol for each cell received over an ingress connection based on an ingress connection identifier corresponding to the cell, wherein when the cell protocol is a first protocol, the ingress line card determines a forwarding decision based on the ingress connection identifier corresponding to the cell, and wherein when the cell protocol is a second protocol, the ingress line card determines the forwarding decision based on a destination address for a packet to which the cell corresponds, wherein the ingress line card forwards at least a portion of the cell over the switching fabric to at least one of the plurality of egress line cards based on the forwarding decision.

* * * * *